United States Patent [19]

Frech

[11] Patent Number: 4,907,259
[45] Date of Patent: Mar. 6, 1990

[54] CALL APPEARANCE RESERVATION ARRANGEMENT

[75] Inventor: Dewey A. Frech, Aurora, Ill.

[73] Assignee: American Telephone and Telegraph Company, AT&T Bell Laboratories, Murray Hill, N.J.

[21] Appl. No.: 118,105

[22] Filed: Nov. 6, 1987

[51] Int. Cl.⁴ ............................................. H04M 3/42
[52] U.S. Cl. .................................. 379/201; 379/164; 379/165; 379/161
[58] Field of Search ............... 379/161, 164, 165, 156, 379/201

[56] References Cited

U.S. PATENT DOCUMENTS

| | | | |
|---|---|---|---|
| 4,096,358 | 6/1978 | Bidlack et al. | 379/165 X |
| 4,278,844 | 7/1981 | Jones | 379/201 X |
| 4,631,364 | 12/1986 | Coyne et al. | 379/268 X |
| 4,646,347 | 2/1987 | Liu | 379/164 X |

FOREIGN PATENT DOCUMENTS 0153140 8/1985 European Pat. Off. .

OTHER PUBLICATIONS

R. L. Bennett, "5ESS ® Switch ISDN Services," International Switching Symposium, Mar. 15-20, 1987, Phoenix, Ariz., p. 344, right hand column, line 41-63.
AT&T System 85 Features Reference Manual, AT&T 555-102-301, Apr., 1986, pp. G-16 & G-22.
AT&T System 85 SMT Administration Management User's Guide, AT&T 555-102-501, Jun., 1986, pp. 121-122.
"AT&T System 75 Reference Manual", *Multi-Appearance Preselection and Preference*, 999-700-232IS, Issue 2, Nov. 1984, pp. 5-91.

*Primary Examiner*—James L. Dwyer
*Attorney, Agent, or Firm*—Ross T. Watland

[57] ABSTRACT

A call appearance reservation arrangement where any number of the call appearances of a directory number are reservable, and where a reservation type is defined for the directory number such that calls to and from the reserved call appearances are processed in accordance with one of a number of possible reservation types, such types for example including: (1) origination only, (2) termination only, and (3) origination and priority termination only.

31 Claims, 5 Drawing Sheets

CALL APPEARANCE RESERVATION ARRANGEMENT

TECHNICAL FIELD

This invention relates to telecommunication call processing.

BACKGROUND AND PROBLEM

Telephone station sets used in a modern business communication environment typically have more than one call appearance of a given directory number so that multiple calls can be in an active state (altering, held, or talking) at the same time. It is desirable to give telephone customers having such multi-appearance sets a measure of control over the calls that can originate from or terminate to the multiple appearances. One known arrangement, a multi-appearance voice terminal of the AT&T System 75 PBX, has the last idle call appearance reserved for originations and priority terminations. It is therefore not possible for all the call appearances to be in use for non-priority terminations, thereby undesirably precluding originations and priority terminations at the terminal. However, in a number of applications, for example where a directory number is shared by multiple terminals in a key-system group or where a member of a terminal group is to receive only calls that are incoming to the terminal group, there is a need to provide customers with more flexible alternatives for controlling the originating and terminating calls at the multiple call appearances of a directory number.

SOLUTION

The foregoing need is met and a technical advance is achieved in accordance with the principles of the invention in a call appearance reservation arrangement where, significantly, any number of the call appearances of a directory number are reservable, and where, advantageously, a reservation type is defined for the directory number such that calls to and from the reserved call appearances are processed in accordance with one of a number of possible reservation types, such types for example including: (1) origination only, (2) termination only, and (3) origination and priority termination only.

Calls to and from one of the call appearances of a directory number are processed in accordance with a method of the invention by determining one of a plurality of reservation types and determining whether the call appearance is reserved. After determining that the call appearance is reserved, the calls are processed in accordance with the determined reservation type.

An originating call from the call appearance is denied when the determined reservation type is termination only. A terminating call to the directory number is denied when the determined reservation type is origination only, or, if the terminating call is a non-priority call, when the determined reservation type is origination and priority termination only.

In an exemplary embodiment described herein, there are N call appearances numbered with consecutive integers from one through N. The R highest-numbered of the N call appearances are reserved. When a directory number is shared by a number of terminals in a key-system group, the fixed reservation of the R highest-numbered call appearances, for example, for originations and priority terminations only, allows the R reserved call appearances to be active at a given terminal of the key-system group without unnecessarily preventing originations from lower-numbered call appearances of the other key-system group terminals. A particular call appearance is determined to be reserved when it is numbered greater than (N−R).

A reverse terminal group screening arrangement may be implemented in the exemplary embodiment such that a terminal is allowed to receive only calls that are incoming to a terminal group—no intra-group calls are received by the terminal. Reverse terminal group screening is implemented for a terminal by having all call appearances reserved for origination and priority termination only, with only calls incoming to the terminal group being defined as priority calls. A terminal is able to have the terminal group ID for the terminal group and therefore have all the features available to the terminal group, without being allowed to receive intra-group calls.

DRAWING DESCRIPTION

Figure 1:
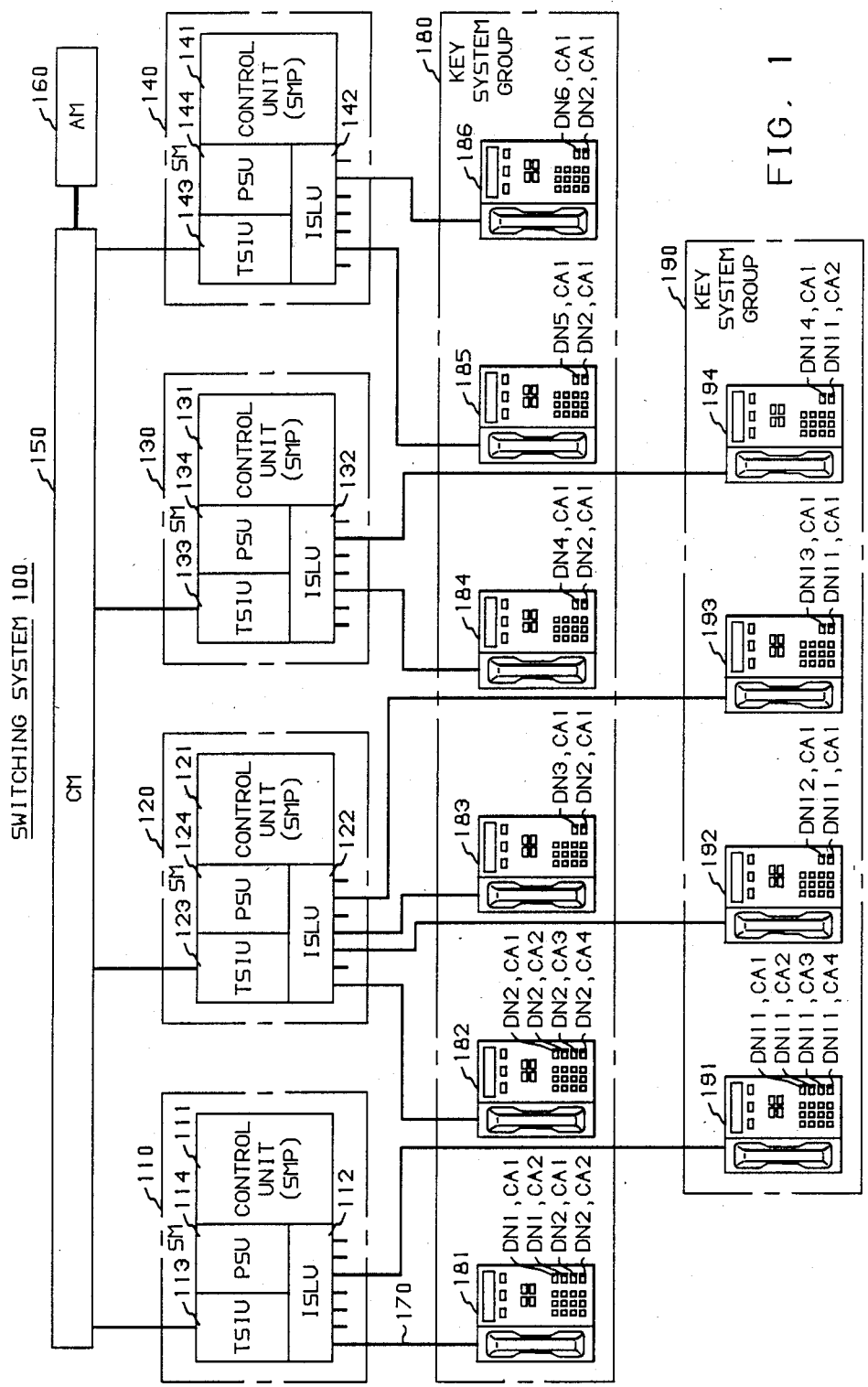
FIG. 1 is a block diagram of an illustrative switching system and associated terminals implementing the call reservation arrangement of the present invention.
Figure 3:
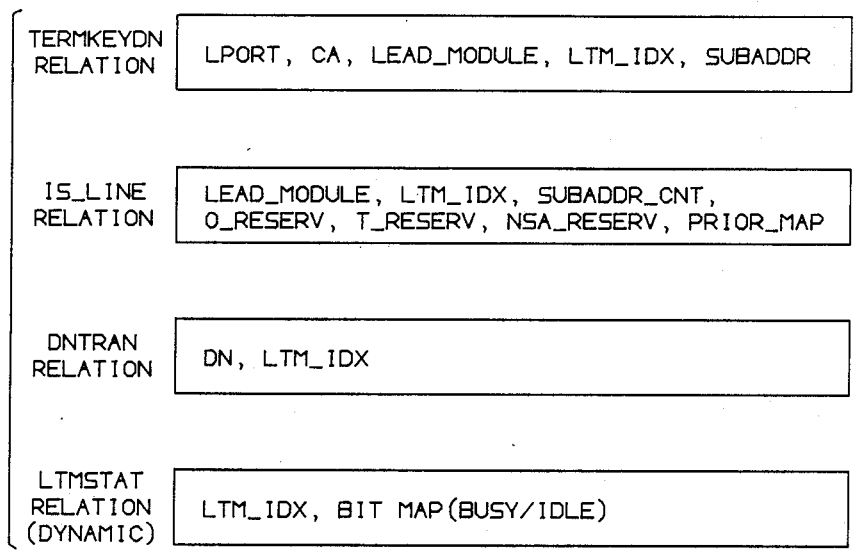
Figure 4:
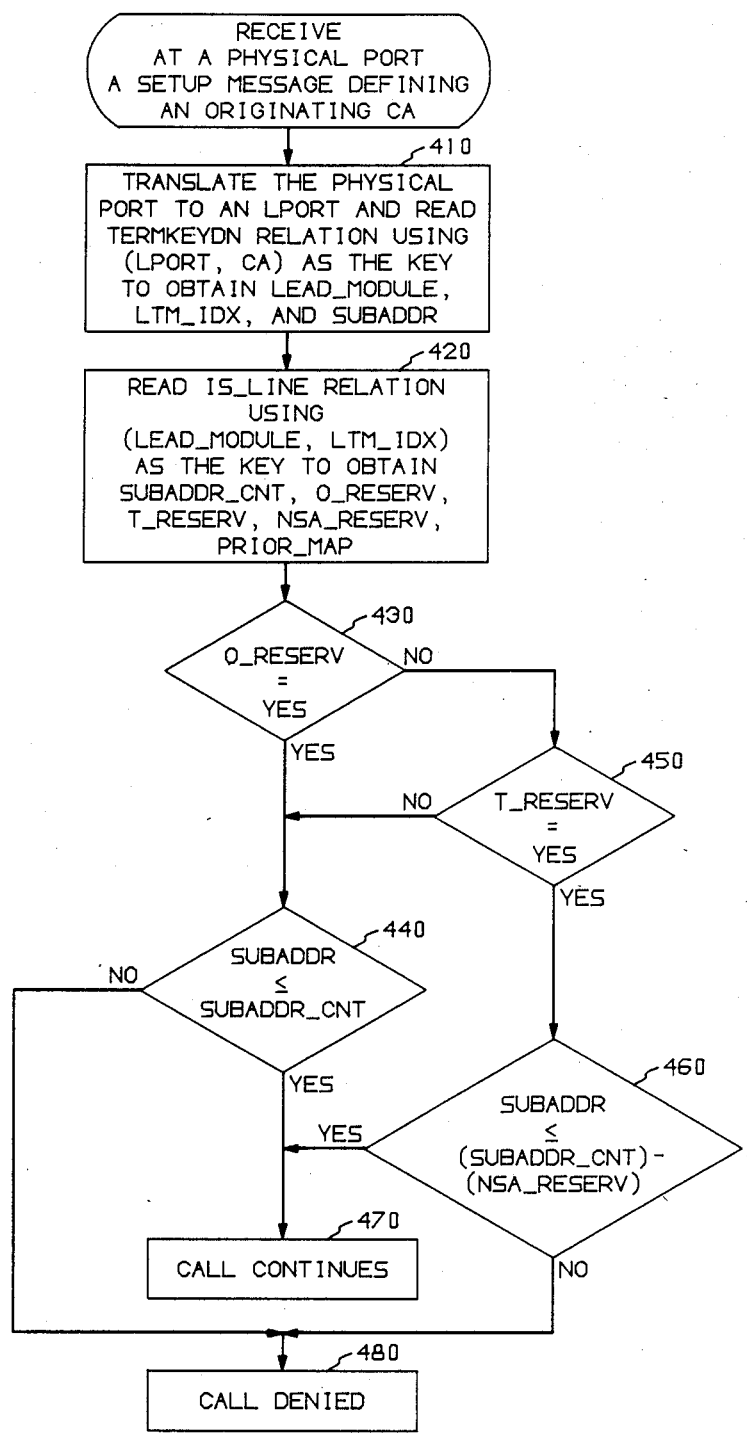
Figure 5:
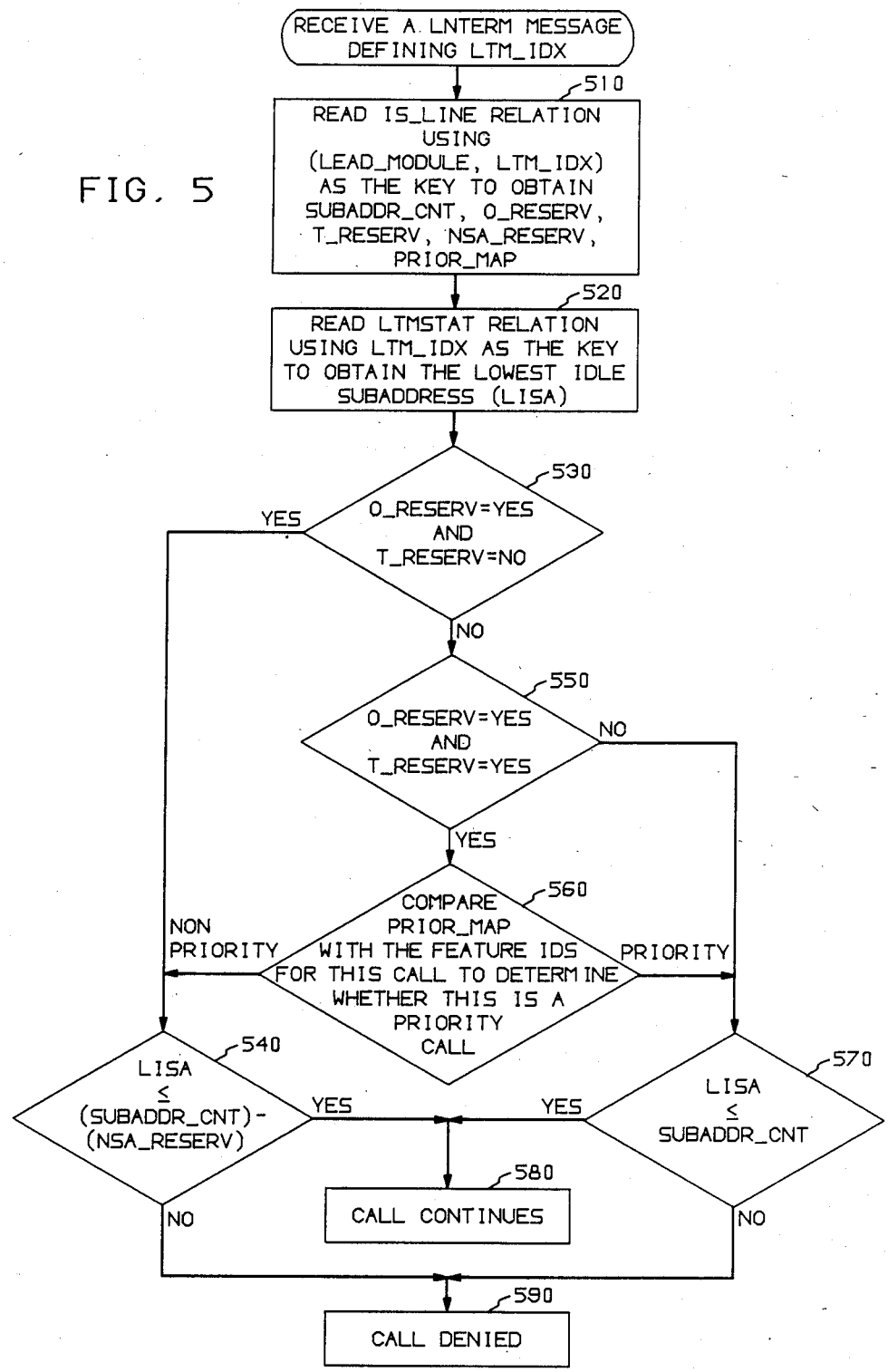

FIG. 3 defines certain data structures used in the switching system of FIG. 1;

FIG. 4 is a flow chart of a call processing program used for originating calls in the switching system of FIG. 1; and FIG. 5 is a flow chart of a call processing program used for terminating calls in the switching system of FIG. 1.

DETAILED DESCRIPTION

The principles of the invention are described in the context of a distributed control, integrated services digital network (ISDN) switching system 100 (FIG. 1). An integrated services digital network is defined as a network evolved from the telephony integrated digital network that provides end-to-end digital connectivity to support a wide range of services, including voice and non-voice services, to which users have access by a limited set of standard multipurpose customer interfaces. System 100 is connectable to analog or digital terminals, however, only digital ISDN terminals 181 through 186 and 191 through 194 are shown in FIG. 1. (Although not shown in FIG. 1, system 100 is also connectable via trunks to terminals associated with other switching systems.) System 100 includes a number of switching modules (SMs) each associated with a different subset of terminals. For example, switching module 110 is associated with terminals 181 and 191, switching module 120 is associated with terminals 182, 183, 192 and 193, switching module 130 is associated with terminals 184 and 194, and switching module 140 is associated with terminals 185 and 186. Each switching module includes a control unit or switching module processor (SMP) for controlling connections to and from its associated subset of terminals. Switching module 110, for example, includes control unit 111 for controlling connections to and from terminals 181 and 191. Similarly, switching modules 120, 130, and 140 include control units 121, 131, and 141, respectively.

Each ISDN user terminal communicates with system 100 in two 64 kilobits per second channels referred to as B-channels and in one 16 kilobits per second channel referred to as a D-channel. In the present embodiment, one B-channel is used to convey digitized voice samples at the rate of 8000, eight-bit samples per second and the other B-channel is used to convey data at a rate of 64 kilobits per second. (However, each B-channel could be used for either voice or data traffic.) The D-channel is used both to convey signaling packets to effect message signaling between ISDN terminals and switching module control units, and to convey data packets between different ISDN terminals.

In the present exemplary embodiment, information is conveyed between an ISDN terminal and system 100 using a four-wire, digital subscriber line (DSL) 170 using one pair of wires for each direction of transmission. DSL 170 transmits a serial bit stream at the rate of 192 kilobits per second which comprises 144 kilobits per second for the above-mentioned two 64 kilobits per second B-channels and one 16 kilobits per second D-channel and which further comprises 48 kilobits per second used for a number of functions including framing, DC balancing, control and maintenance. DSL 170 represents what is referred to by the International Telegraph and Telephone Consultative Committee (CCITT) as the T-interface. The use of the T-interface is only exemplary, however, as the invention is equally applicable to systems using other access methods.

Signaling packets are conveyed between terminals and the switching module control units enclosed in level 2 (link-level) frames in accordance, for example, with the standard LAPD protocol. The exemplary signaling messages used for the control of circuit-switched voice calls are in accordance with CCITT recommendation Q.931.

The architecture of system 100 has a communications module (CM) 150 as a hub, with the switching modules 110, 120, 130, and 140, and an administrative module (AM) 160 emanating therefrom. Each switching module includes an integrated services line unit (ISLU) which terminates the digital subscriber lines and provides access to a time-slot interchange unit (TSIU) and a packet switching unit (PSU). For example, in switching module 110, ISLU 112 terminates the digital subscriber lines, and TSIU 113 and PSU 114 respectively provide circuit-switched and packet-switched connections to and from the associated terminals under the control of control unit 111. Switching modules 120, 130 and 140 similarly include ISLUs 122, 132, and 142, TSIUs 123, 133, and 143, and PSUs 124, 134, and 144.

Communications module 150 includes a time-shared, space-division switch or time-multiplexed-switch, that provides 64 kilobits per second circuit-switched paths between switching modules. It supports B-channel traffic between switching modules, as well as packet traffic between PSUs in different switching modules. The switching module control unit provides call processing and overall control and maintenance functions for the switching module. Switching module control units in different switching modules communicate with each other and with the administrative module 160 through a message switch (not shown) in the communications module, using an internal message protocol. The architecture provides flexibility in placing specific processing functions in specific processing elements. The general strategy is to place much of the required processing capability in the switching module control units, but to reserve the administrative module for those functions that are inherently centralized. The call processing functions can for example be distributed in a number of ways. In one alternative, most of the call processing functions are placed in the switching module control units with routing, terminal hunting, and path hunt functions located in the administrative module. In another alternative, all call processing functions are placed in the switching module control units, with the administrative module reserved for truly administrative processing.

Figure 2:
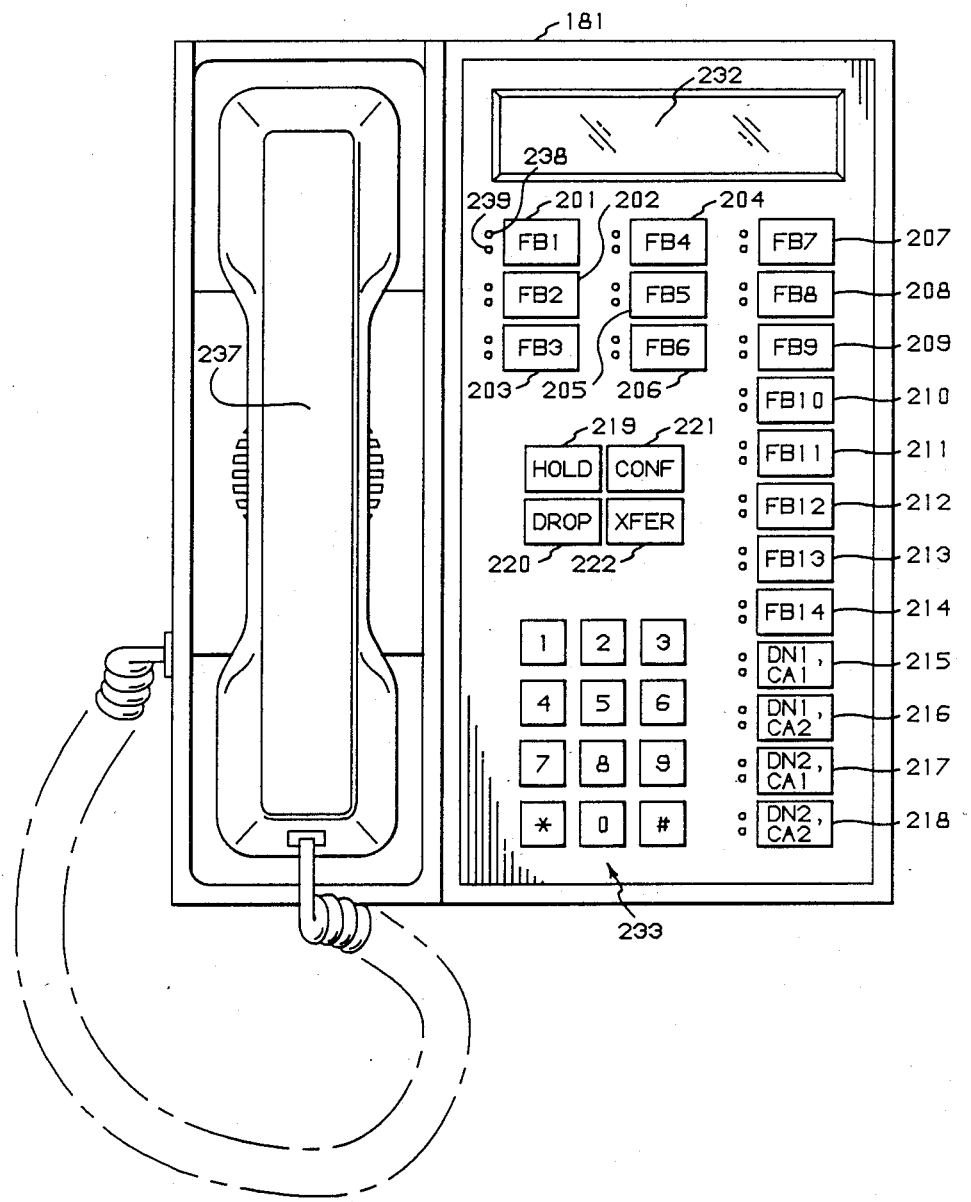
FIG. 2 is a more detailed depiction of one of the terminals of FIG. 1.

An exemplary ISDN terminal 181 is shown in FIG. 2. Terminal 181 includes a handset 237, a telephone keypad 233 and a display 232 for visually displaying messages. Terminal 181 also includes 22 buttons 201 through 222. Buttons 219 through 222 are only used for the HOLD, DROP, CONFERENCE and TRANSFER functions. The remaining buttons are configured at terminal 181 such that buttons 201 through 214 are feature buttons and buttons 215 through 218 are call appearances. However, the identical terminal could be configured to meet different user requirements, for example such that buttons 201 through 206 are call appearances and buttons 207 through 218 are feature buttons. Each call appearance or feature button has associated in-use and status lamps. For example, button 201 has associated in-use lamp 238 and status lamp 239. The in-use lamp is lit for a call appearance when that call appearance is the selected call appearance at the terminal. The status lamp is used to indicate the various stages of the call, alerting, active, etc., or to indicate the activation of feature buttons.

The terminals shown in FIG. 1 comprise two key-system groups 180 and 190. A key-system group is a set of terminals that share one or more call appearances for a single directory number (DN). The dynamic busy/idle status information for a key-system group is stored by the control unit of the switching module connected to a lead terminal of the group. Each terminal has a primary DN. If a group shared DN is primary at any terminal, that terminal is selected as the lead terminal. The lead terminal has the maximum number of call appearances for the shared DN. If the group shared DN is not primary at any terminal, then the lead terminal is selected as follows. If one terminal of the group has more call appearances of the shared DN than any of the other group terminals, the terminal having more call appearances is selected as the lead terminal. If multiple terminals of the group each have the same maximum number of call appearances of the shared DN but one of those terminals is on a switching module that has more call appearances of the shared DN than the other terminals, the terminal on the switching module having more call appearances is selected as the lead terminal. If multiple terminals of the group each have the same maximum number of call appearances of the shared DN are on switching modules having the same number of call appearances of the shared DN, one of the multiple terminals is arbitrarily selected as the lead terminal. The control unit that stores the busy/idle status information for a key-system group is referred to herein as the lead control unit. The lead control unit is the control unit of the switching module connected to the lead terminal.

Key-system group 180 comprises terminals 181 through 186, having primary DNs DN1 through DN6 respectively. DN2 is the shared DN for group 180, terminal 182 is the lead terminal and control unit 121 is the lead control unit. Terminal 182 has the maximum number of call appearances for DN2, four. The dynamic busy/idle status information for the four call appearances of DN2 is stored in lead control unit 121. Key-system group 190 comprises terminals 191 through 194, having primary DNs DN11 through DN14 respectively. DN11 is the shared DN for group 190, terminal 191 is the lead terminal and control unit 111 is the lead control unit. Terminal 191 has the maximum number of call appearances for DN11, four. The dynamic busy/idle status information for the four call appearances of DN11 is stored in lead control unit 111. The processing of calls to and from terminals of key-system groups is performed cooperatively by the control units associated with those terminals.

The number of simultaneous voice calls for any directory number (DN) is equal to the number of subaddresses for that DN. In system 100 shown in FIG. 1, DN2 has four subaddress SA1 through SA4. Subaddresses correspond to call appearances on ISDN terminals. For the four subaddresses of DN2, for example, subaddress SA1 corresponds to DN2, CA1 on terminals 181 through 186, subaddress SA2 corresponds to DN2, CA2 on terminals 181 and 182, subaddress SA3 corresponds to DN2, CA3 on terminal 182, and subaddress SA4 corresponds to DN2, CA4 on terminal 182. In the present embodiment, a customer has at most 16 subaddresses per DN. The customer has the option of reserving idle subaddresses for a particular DN. In the present embodiment, the reservation is one of three mutually exclusive types: reservation type (1) termination only—any attempt to originate on the reserved subaddress is denied; reservation type (2) origination only—any attempt to terminate to the reserved subaddress results in busy treatment; and reservation type (3) origination and priority termination only—terminations to the reserved subaddress receive busy treatment unless they qualify as priority terminations, in which case they terminate normally. Other reservation types, for example priority termination only, may be used in other embodiments. In the present embodiment, there are four call types definable as priority calls: (1) originating call waiting calls, (2) ISDN intercom calls (calls between terminals of an intercom group that can originate intra-group calls by activating an intercom feature button and dialing a single digit to identify a called group member), (3) incoming calls (incoming to a terminal group), (4) precedence calls (calls having a precedence value used for example to allow a call of higher precedence to preempt the use of a facility being used for a call of lower precedence). A customer selecting reservation type 3 must select one or more of the four call types to be priority calls. Subaddress reservation for a DN applies to its highest-numbered subaddresses. For example, if a DN has a total of four subaddresses with two subaddresses reserved for origination, subaddresses SA3 and SA4 are reserved for origination.

Call originations are processed as follows. In response to an origination at a terminal, a SETUP message is transmitted from the terminal, received at a given physical port of system 100, and then conveyed to the control unit of the SM associated with the terminal. The SETUP message includes a definition of the originating call appearance CA. In response, the control unit executes the program shown in flow chart form in FIG. 4. Processing begins with block 410 where the physical port is translated to a logical port LPORT and a TERMKEYDN relation (FIG. 3) is read using (LPORT, CA) as the key to obtain values of a LEAD_MODULE variable defining the lead module of the key system group if the terminal is included in such key system group, a packed index LTM_IDX corresponding to the DN, and the DN subaddress SUBADDR that corresponds to the originating CA. In block 420 an IS_LINE relation (FIG. 3) is read using (LEAD_MODULE, LTM_IDX) as the key to obtain values of the following variables: SUBADDR_CNT defining the total number of subaddresses for the DN, O_RESERV defining whether origination reservation applies, T_RESERV defining whether termination reservation applies, NSA_RESERV defining the number of reserved subaddresses for the DN, and PRIOR_MAP defining by a bit map up to four priority call types for the DN. (SUBADDR_CNT and NSA_RESERV are also referred to herein as the positive integers N and R, respectively.) Values of O_RESERV=YES and T_RESERV=NO define reservation type 1, origination only. Values of O_RESERV=NO and T_RESERV=YES define reservation type 2, termination only. Values of O_RESERV=YES and T_YES define reservation type 3, origination and priority termination only. Values of O_RESERV=NO and T_RESERV=NO define no reservation. Execution proceeds to decision block 430 and a check is made to determine whether O_RESERV=YES. If O_RESERV=YES indicating either reservation type 1, origination only, or reservation type 3, origination and priority termination only, execution proceeds from block 430 to decision block 440 where a check is performed to verify that the originating subaddress SUBADDR is less than or equal to SUBADDR_CNT, the total number of subaddresses for the DN. This check is made to prevent a customer from having more active calls than have been subscribed. If the check yields an affirmative result, execution proceeds from block 440 to block 470 and processing of the call continues. If the check yields a negative result, execution proceeds from block 440 to block 480 where the originating call is denied by system 100 transmitting a REL_COMP message to the terminal.

Returning to decision block 430, if it is determined that O_RESERV≠YES, execution proceeds from block 430 to decision block 450 and a check is made to determine whether T_RESERV=YES. If T_RESERV=YES indicating reservation type 2, execution proceeds from block 450 to decision block 460 where a check is made to determine whether the originating subaddress SUBADDR is one of the reserved, higher-numbered subaddresses. The check is performed by comparing the originating subaddress SUBADDR with the difference between SUBADDR_CNT, the total number of subaddresses for the DN, and NSA_RESERV, the number of reserved subaddresses. If the check determines that the originating subaddress SUBADDR is not reserved, execution proceeds from block 460 to block 470 and processing of the call continues. If the check determines that the originating subaddress SUBADDR is reserved, execution proceeds to block 480 where the originating call is denied. Returning to decision block 450, if the check indicates that T_RESERV=NO, there is no reservation. Execution proceeds from block 450 to block 440 and processing of the call continues.

Call terminations are processed as follows. Depending on the degree to which call processing is distributed, translation of the called DN is performed in either the AM or one of the SMs by reading a DNTRAN relation (FIG. 3) using the called DN as the key to determine a value of the corresponding packed index LTM_IDX. The result is passed via an inter-module LNTERM control message to the terminating SM. In response to the LNTERM message the control unit of the terminating SM executes the program shown in flow chart form in FIG. 5. In accordance with the present embodiment, calls to key-system groups are terminated to the lead module. Therefore, the variable LEAD_MODULE is known to define the terminating module. Processing begins with block 410 where the IS_LINE relation (FIG. 3) is read using (LEAD_MODULE, LTM_IDX) as the key to obtain values of the following variables: SUBADDR_CNT defining the total number of subaddresses for the DN, O_RESERV defining whether origination reservation applies, T_RESERV defining whether termination reservation applies, NSA_RESERV defining the number of reserved subaddresses for the DN, and PRIOR_MAP defining by a bit map up to four priority call types for the DN. Execution proceeds from block 510 to block 520 where an LTMSTAT relation (FIG. 3) including a bit map defining the busy/idle status of the subaddresses of a DN is read to determine the lowest idle subaddress LISA for the called DN. Execution then proceeds to decision block 530 and a check is made to determine whether O_RESERV=YES and T_RESERV=NO. If O_RESERV=YES and T_RESERV=NO indicating reservation type 1, origination only, execution proceeds from block 530 to decision block 540 where a check is made to determine whether the lowest idle subaddress LISA is one of the reserved, higher-numbered subaddresses. The check is performed by comparing the value of LISA with the difference between SUBADDR_CNT, the total number of subaddresses for the DN, and NSA_RESERV, the number of reserved subaddresses. If the check determines that the lowest idle subaddress LISA is not reserved, execution proceeds from block 540 to block 580 and processing of the call continues. If the check determines that the lowest idle subaddress is reserved, execution proceeds to block 590, the terminating call is denied and busy treatment is provided to the originating terminal.

If the check performed in block 530 yields a negative result, execution proceeds instead to decision block 550 where a check is made to determine whether O_RESERV=YES and T_RESERV=YES. If O_RESERV=YES and T_RESERV=YES indicating reservation type 3, origination and priority termination only, execution proceeds from block 550 to decision block 560. The LNTERM message received for the call included feature ID information defining whether the present call is an originating call waiting call (from within the same terminal group), an ISDN intercom call, an incoming call to the terminal group, or a PP precedence call. In block 560, the bit map PRIOR_MAP read from the IS_LINE relation is compared with the feature IDs for the call to determine whether the call is a priority call. If the call is a non-priority call, execution branches from block 560 to decision block 540 and processing continues through either block 580 or block 590 as previously described. If the call is a priority call, execution proceeds from block 560 to block 570 where a check is performed to verify that the lowest idle subaddress LISA is less than or equal to SUBADDR_CNT, the total number of subaddresses for the DN. This check is made to prevent a customer from having more active calls than have been subscribed. If the check yields an affirmative result, execution proceeds from block 570 to block 580 and processing of the call continues. If the check yields a negative result, execution proceeds from block 570 to block 590 where the terminating call is denied and busy treatment is provided to the originating terminal.

Returning to decision block 550, if the check performed yields a negative result indicating that either reservation type 2, terminations only, or no reservation, is applicable, execution proceeds from block 550 to decision block 570 and then to either blocks 580 or 590 as previously described.

The flexibility of the call appearance reservation arrangement is illustrated herein by several examples. First consider that an executive at terminal 182 (FIG. 1) has three of the four call appearances of DN2 at terminal 182 defined as having reservation type 3, origination and priority termination only. Since the higher-numbered subaddresses are the ones reserved, DN2 call appearances CA2, CA3, and CA4 are reserved at terminal 182, and DN2 call appearance CA1 is non-reserved. If the executive is making a call, for example to set up a golf date, and wishes to be interrupted by business-related calls, he may initiate the call using one of the reserved appearances CA2, CA3, or CA4. Any incoming call is offered to terminal 182 at the non-reserved call appearance CA1 and the executive is alerted so that he may interrupt the present conversation to take the incoming call. However, when the executive is making an important business call and does not wish to be interrupted, he initiates the call using the non-reserved call appearance CA1. Only priority calls will terminate to DN2 during the important call since the only non-reserved call appearance is busy. Other calls are routed to call coverage rather than alerting the executive during the important conversation.

As a second example, consider that a customer at terminal 182 has one of the four call appearances of DN2 at terminal 182 defined as having reservation type 1, origination only. Call appearance CA4 is reserved and call appearances CA1, CA2, and CA3 are non-reserved. Call appearance CA4 is therefore always available to the customer to initiate an emergency call.

A third example illustrates the advantages of the reservation arrangement of the invention when used in association with key-system groups such as groups 180 and 190 (FIG. 1). A customer having directory number DN2 has subaddresses SA3 and SA4 defined as having reservation type 3, origination and priority termination only. Directory number DN2 is the shared DN for key-system group 180. Terminal 182 therefore has DN2 call appearances CA3 and CA4 reserved. None of the other terminals of key-system group 180 has a call appearance corresponding to the reserved subaddresses SA3 and SA4. Two calls may be active (for example in a talk, hold, or alerting state) at the reserved call appearances CA3 and CA4 of terminal 182 and a customer at any of the other terminals of key-system group 180 is still able to initiate a call from DN2.

A fourth example illustrates an arrangement referred to herein as reverse terminal group screening. A terminal group comprises two or more terminals that have restrictions for certain features or interactions. A fully restricted terminal group is a group of terminals that can only originate intra-group calls. A semi-restricted terminal group is a group of terminals that can originate intra-group calls and calls to the attendant for the terminal group. With reverse terminal group screening, terminals can receive only calls that are incoming to the terminal group—no intra-group calls can be received. Reverse terminal group screening is implemented for a terminal, for example, terminal 182, by defining all four call appearances CA1 through CA4 as being reserved for origination and priority termination only, reservation type 3, with the priority calls being defined as calls incoming to the terminal group. Terminal 182 is able to have the terminal group ID for the terminal group, and therefore have all the features available to the terminal group, without being allowed to receive intra-group calls.

What is claimed is:

1. A method of processing calls to and from one of a plurality of call appearances of a directory number comprising the following steps:

in response to said calls, determining one of a plurality of reservation types and determining whether said one call appearance is reserved, and after a determination that said one call appearance is reserved, denying ones of said calls based on said determined reservation type.

2. A method in accordance with claim 1 wherein said denying comprises for an originating call, denying said originating call when said determined reservation type is termination only.

3. A method in accordance with claim 1 wherein said denying step comprises for a terminating call, denying said terminating call when said determined reservation type is origination only.

4. A method in accordance with claim 1 wherein said denying step comprises for a terminating call, determining whether said terminating call is a non-priority call, and after a determination that said terminating call is a non-priority call, denying said terminating, non-priority call when said determined reservation type is origination and priority termination only.

5. A method in accordance with claim 1 wherein said denying step comprises for a terminating call, determining whether said terminating call is a non-priority call, and after a determination that said terminating call is a non-priority call, denying said terminating, non-priority call when said determined reservation type is priority termination only.

6. A method in accordance with claim 1 wherein more than one of said plurality of call appearances are reserved.

7. A method in accordance with claim 1 wherein said plurality of call appearances comprises N call appearances, N being a positive integer greater than one, said N call appearances being numbered with consecutive integers from one through N, with R highest-numbered of said N call appearances being reserved, R being a positive integer at most equal to N, and wherein said step of determining whether said one call appearance is reserved comprises determining whether said one call appearance is numbered greater than (N−R).

8. A method of processing a call to a directory number having a plurality of call appearances comprising the following steps:

in response to said call, determining one of a plurality of reservation types, choosing one of said plurality of call appearances, and determining whether said chosen call appearance is reserved, and after a determination that said chosen call appearances is reserved, denying ones of said calls based on said determined reservation type.

9. A method in accordance with claim 8 wherein said plurality of call appearances are uniquely numbered and said choosing step comprises choosing the lowest-numbered idle one of said plurality of call appearances.

10. A method in accordance with claim 8 wherein said processing step comprises denying said call when said determined reservation type is origination only.

11. A method in accordance with claim 8 wherein said processing step comprises determining whether said call is a non-priority call, and after a determination that said call is a non-priority call, denying said non-priority call when said determined reservation type is origination and priority termination only.

12. A method in accordance with claim 11 where all of said plurality of call appearances are reserved, where calls that are incoming to a terminal group are defined as priority calls, said terminal group including a terminal having said directory number, and wherein said step of determining whether said call is a non-priority call comprises determining whether said call is not incoming to said terminal group.

13. A method in accordance with claim 8 wherein said processing step comprises determining whether said call is a non-priority call, and after a determination that said call is a non-priority call, denying said non-priority call when said determined reservation type is priority termination only.

14. A method in accordance with claim 13 where all of said plurality of call appearances are reserved, where calls that are incoming to a terminal group are defined as priority calls, said terminal group including a terminal having said directory number, and wherein said step of determining whether said call is a non-priority call comprises determining whether said call is not incoming to said terminal group.

15. A method in accordance with claim 8 wherein more than one of said plurality of call appearances are reserved.

16. A method in accordance with claim 8 wherein said plurality of call appearances comprises N call appearances, N being a positive integer greater than one, said N call appearances being numbered with consecutive integers from one through N, with R highest-numbered of said N call appearances being reserved, R being a positive integer at most equal to N, and wherein said step of determining whether said chosen call appearance is reserved comprises determining whether said one call appearance is numbered greater than (N−R).

17. A method of processing calls to and from one of a plurality of call appearances of a directory number, wherein said plurality of call appearances comprises N call appearances, N being a positive integer greater than one, said N call appearances being numbered with consecutive integers from one through N, with R highest-numbered of said N call appearances being reserved, R being a positive integer at most equal to N, said method comprising the following steps:

in response to said calls, determining whether said one call appearance is numbered greater than (N−R), and after a determination that said one call appearance is numbered greater than (N−R), processing said calls in accordance with a given reservation type.

18. A method in accordance with claim 17 wherein said processing step comprises
for an originating call, denying said originating call when said given reservation type is termination only.

19. A method in accordance with claim 17 wherein said processing step comprises
for a terminating call, denying said terminating call when said given reservation type is origination only.

20. A method in accordance with claim 17 wherein said processing step comprises
for a terminating call, determining whether said terminating call is a non-priority call, and
after a determination that said terminating call is a non-priority call, denying said terminating, non-priority call when said given reservation type is origination and priority termination only.

21. A method in accordance with claim 17 wherein said processing step comprises
for a terminating call, B1) determining whether said terminating call is a non-priority call, and
after a determination that said terminating call is a non-priority call, B2) denying said terminating, non-priority call when said given reservation type is priority termination only.

22. An apparatus for processing calls to and from one of a plurality of call appearances of a directory number comprising
first means responsive to said calls for determining one of a plurality of reservations types,
second means responsive to said calls for determining whether said one call appearance is reserved, and
third means, responsive to a determination by said second means that said one call appearance is reserved, for denying ones of said calls based on a reservation type determined by said first means.

23. An apparatus in accordance with claim 22 wherein said third means comprises
means for denying an originating call when said determined reservation type is termination only.

24. An apparatus in accordance with claim 22 wherein said third means comprises
means for denying a terminating call when said determined reservation type is origination only.

25. An apparatus in accordance with claim 22 wherein said third means comprises
fourth means for determining whether a terminating call is a non-priority call, and
fifth means, responsive to a determination by said fourth means that said terminating call is a non-priority call, for denying said terminating, non-priority call when said determined reservation type is origination and priority termination only.

26. An apparatus in accordance with claim 22 wherein said third means comprises
fourth means for determining whether a terminating call is a non-priority call, and
fifth means, responsive to a determination by said fourth means that said terminating call is a non-priority call, for denying said terminating, non-priority call when said determined reservation type is priority termination only.

27. An apparatus in accordance with claim 22 wherein more than one of said plurality of call appearances are reserved.

28. An apparatus in accordance with claim 22 wherein said plurality of call appearances comprises N call appearances, N being a positive integer greater than one, said N call appearances being numbered with consecutive integers from one through N, with R highest-numbered of said N call appearances being reserved, R being a positive integer at most equal to N, and wherein said second means comprises
means for determining whether said one call appearance is numbered greater than (N−R).

29. An apparatus for processing a call to a directory number having a plurality of call appearances comprising
first means responsive to said call for determining one of a plurality of reservation types,
second means responsive to said call for choosing one of said plurality of call appearances,
third means responsive to said call for determining whether a call appearance chosen by said second means is reserved, and
fourth means, responsive to a determination by said third means that said chosen call appearance is reserved, for processing said call in accordance with a reservation type determined by said first means.

30. An apparatus in accordance with claim 29 wherein said plurality of call appearances are uniquely numbered and said second means comprises
means for choosing the lowest-numbered idle one of said plurality of call appearances.

31. An apparatus for processing calls to and from one of a plurality of call appearances of a directory number, wherein said plurality of call appearances comprises N call appearances, N being a positive integer greater than one, said N call appearances being numbered with consecutive integers from one through N, with R highest-numbered of said N call appearances being reserved, R being a positive integer at most equal to N, said apparatus comprising
means responsive to said calls for determining whether said one call appearance is numbered greater than (N−R), and
means, responsive to a determination by said determining means that said one call appearance is numbered greater than (N−R), for processing said calls in accordance with a given reservation type.

* * * * *

UNITED STATES PATENT AND TRADEMARK OFFICE
CERTIFICATE OF CORRECTION

PATENT NO. : 4,907,259
DATED : March 6, 1990
INVENTOR(S) : Dewey A. Frech

It is certified that error appears in the above-identified patent and that said Letters Patent is hereby corrected as shown below:

Column 9, line 20, "denying comprises" should be "denying step comprises";
Column 9, lines 66 and 67, "appearances" should be "appearance";
Column 10, line 7, "processing" should be "denying";
Column 10, line 11, "processing" should be "denying";
Column 10, line 28, "processing" should be "denying"

Signed and Sealed this

Seventeenth Day of March, 1992

Attest:

HARRY F. MANBECK, JR.

*Attesting Officer*      *Commissioner of Patents and Trademarks*